United States Patent [19]

Hamer et al.

[11] Patent Number: 4,864,554
[45] Date of Patent: Sep. 5, 1989

[54] METHOD OF AND DEVICE FOR SCANNING A RADIATION-SENSITIVE SURFACE OF A ROTATING CARRIER WITH A RADIATION BEAM

[75] Inventors: René H. Hamer; Cornelis P. Du Pau, both of Eindhoven, Netherlands

[73] Assignee: U.S. Philips Corporation, New York, N.Y.

[21] Appl. No.: 99,568

[22] Filed: Sep. 22, 1987

[30] Foreign Application Priority Data

Jun. 22, 1987 [NL] Netherlands .......................... 8701448

[51] Int. Cl.$^4$ .............................................. G11B 19/28
[52] U.S. Cl. ........................................ 369/50; 369/43; 358/489
[58] Field of Search .................. 358/289, 342; 369/32, 369/43, 50, 44, 95, 116

[56] References Cited

U.S. PATENT DOCUMENTS

| | | | |
|---|---|---|---|
| 4,028,732 | 6/1977 | Salter et al. | 369/116 X |
| 4,200,893 | 4/1980 | Matison | 369/28 X |
| 4,371,894 | 2/1983 | Gamras | 369/14 X |
| 4,397,011 | 8/1983 | Ogawa | 369/50 |
| 4,513,406 | 4/1985 | Ishihara | 369/32 |
| 4,543,650 | 9/1985 | Wachi | 369/50 X |
| 4,603,412 | 9/1985 | Yamazaki | 369/50 |

Primary Examiner—William L. Sikes
Assistant Examiner—Akm E. Ullah
Attorney, Agent, or Firm—Algy Tamoshunas; Leroy Eason

[57] ABSTRACT

A method and apparatus for scanning a rotating optical disc record carrier with a radiation beam which forms a scanning spot on the carrier and which is moved radially relative thereto. Pulses are generated at a frequency proportional to the angular velocity of the carrier, and clock pulses are generated at a constant frequency differing from and preferably higher than that of the velocity pulses. In response to each velocity pulse an accumulator is incremented by a first correction value (INC) and in response to each clock pulse the accumulator is decremented by a second correction value (DEC). The angular velocity of the record carrier is controlled to maintain a constant value of the average of the sum output of the accumulator over the intervals between successive velocity pulses, and the correction values are adjusted so that the ratio thereof is maintained proportional to the radial distance between the scanning spot and the axis of rotation of the carrier. Scanning is thereby accurately maintained at a constant linear scanning velocity.

9 Claims, 7 Drawing Sheets

METHOD OF AND DEVICE FOR SCANNING A RADIATION-SENSITIVE SURFACE OF A ROTATING CARRIER WITH A RADIATION BEAM

BACKGROUND OF THE INVENTION

1. Field of the Invention

The invention relates to a method of scanning a radiation-sensitive surface of a disc-shaped optical record carrier which rotates about a centre of rotation by means of a radiation beam which is directed towards the carrier, the angular velocity of the carrier being substantially inversely proportional to the radial distance between the centre of rotation and the point of incidence of the radiation beam on the carrier. Clock pulses of predetermined frequency and velocity pulses of a frequency proportional to the angular velocity of the carrier are generated and utilized to control such angular velocity.

The invention further relates to apparatus for scanning a radiation-sensitive surface of a rotating optical record carrier by means of a radiation beam, comprising a drive system for rotating the carrier about an axis, an optical system which is radially movable relative to the record carrier, for directing the radiation beam towards the carrier, and a velocity control circuit for controlling the angular velocity of the carrier to a value which is substantially inversely proportional to the distance between the centre of rotation and the point of incidence of the radiation beam on the carrier. The control circuit comprises a clock generator for generating clock pulses and a velocity-pulse generator for generating velocity pulses of a frequency proportional to the angular velocity of the carrier.

2. Description of the Related Art

Such a method and apparatus are used in manufacturing optically readable record carriers which are to be read at a constant linear velocity. During recording on the radiation-sensitive surface of the carrier, for example a photoresist, the scanning radiation beam is modulated in conformity with the information to be recorded. After this, the scanned carrier is subjected to a photo-etching process, yielding a master record carrier having the desired information structure, of which subsequently replicas can be made.

A method and apparatus as described in the opening paragraph are known from U.S. Pat. No. US 4,190,860.

In the method and apparatus described therein the angular velocity of the carrier is controlled by means of phase-locked loop techniques, the angular velocity of the carrier being controlled in such a manner that the velocity pulses remain in phase with reference pulses of a frequency proportional to the desired angular velocity. These reference pulses are derived from the clock pulses by means of a frequency divider having a variable divisor. The divisor is derived from the radial position of an optical system for directing the radiation beam to the carrier. A scanning device provided with such an angular velocity control has the drawback that when the control system is initially rendered operative auxiliary control systems are necessary to bring the angular velocity of the record carrier to a value at which the frequency difference between the reference pulses and the velocity pulses is sufficiently low to establish phase-locking. Moreover, phase-locked loop techniques have the disadvantage that they are not well suited to be carried out by means of a programmable circuit, for example a microcomputer.

A further drawback of the known scanning apparatus is that only a limited number of different scanning speeds can be obtained, because only integral divisors are permitted in deriving the reference pulses. In particular, in the manufacture of optical record carriers, which have to comply with very stringent accuracy requirements, this limitation is a significant drawback.

The last-mentioned drawback can be mitigated by the use of very large divisors for the frequency division. However, this has the disadvantage that the frequency of the clock signal must be very high. These very high frequencies make it virtually impossible to provide angular-velocity control with a satisfactory adjustment accuracy by means of a programmable circuit.

SUMMARY OF THE INVENTION

It is the object of the invention to provide a method and apparatus as defined in the opening paragraphs, which mitigate the above drawbacks. With respect to the method this object is accomplished in accordance with the invention in that in response to a clock pulse a sum value is corrected by a first correction value and in response to a velocity pulse the sum value is corrected by a second correction value of a sign opposite to that of the first correction value, the angular velocity of the record carrier being controlled to maintain the average of the sum value substantially constant. The ratio between the second and first correction value is maintained at a value proportional to the radial scanning distance by adapting the first and/or the second correction value.

As regards the apparatus said object is achieved in accordance with the invention in that the velocity control circuit comprises means for correcting a sum value by a first correction value in response to a clock pulse, means for correcting such sum value in response to a velocity pulse by a second correction value of opposite sign, control means for controlling the angular velocity so as to maintain the average sum value constant. The angular velocity is adjusted to a value proportional to the radial scanning distance by adapting the first and/or the second correction value so that the ratio thereof is proportional to said distance.

In the method in accordance with the invention the angular velocity of the record carrier is controlled to a value for which the sum value remains constant, which means that the frequency of the velocity pulses, which frequency is proportional to the angular velocity, is maintained equal to the quotient of the first and the second correction value multiplied by the clock-pulse frequency. Since the angular velocity of the record carrier is proportional to the quotient of two adjustable correction values the velocity can be controlled very accurately. Moreover, for the required accuracy the frequency of the clock signal can remain sufficiently low to enable the method to be carried out by means of programmable circuits.

During control of the angular velocity the sum value varies at a frequency equal to the velocity-pulse frequency or the clock-pulse frequency, whichever is lower. In order to prevent these variations from adversely affecting the angular velocity, it is desirable that the frequency of the sum-value variations be situated far outside the bandwidth of the angular-velocity control system. Compared with the generation of high-frequency clock pulses, generating a velocity signal with a large number of velocity pulses per revolution of the record carrier by means of the customary pulse discs or a.c. tachogenerators is technically difficult, so that it is preferred to select the clock-pulse frequency to be higher than the velocity-pulse frequency corresponding to the desired angular velocity. This is the simplest method of obtaining a sufficiently high frequency for the sum value variations.

The influence of said sum value variations can be eliminated completely if for controlling the angular velocity only the sum values at instants corresponding to a predetermined phase of the velocity pulses are selected.

If, as will generally be the case, the frequency of the clock pulses is not a multiple of the frequencies of the velocity pulses, the number of clock pulses generated in the interval between two consecutive velocity pulses will not be the same for all the intervals. This results in a low-frequency oscillation in the selected sum value, which oscillation has an adverse effect on the angular velocity control. Such an adverse effect can be precluded by deriving the clock pulses from a periodic signal of a higher frequency by means of a cyclic counter, a clock pulse being generated each time that a final count is reached, to correct the selected sum value by a third correction value equal to the ratio between the number of clock pulses counted, as represented by the instantaneous count, and the counting range of the counter, multiplied by the first correction value, and the angular velocity of the record carrier being controlled to a value for which the average of the corrected selected sum value is substantially constant.

In this way it is achieved that the difference between consecutive control values always corresponds to the difference between the second correction value and the first correction value, multiplied by the ratio between the clock frequency and the velocity-signal frequency, so that the difference between two consecutive control values always corresponds to the difference between the desired and the actual angular velocity of the record carrier, as a result of which the oscillation in the angular velocity control is eliminated.

BRIEF DESCRIPTION OF THE DRAWINGS

Embodiments of the invention and further advantages thereof will now be described in more detail, by way of example, with reference to FIGS. 1 to 15, of which

DESCRIPTION OF THE PREFERRED EMBODIMENTS

Figure 1:
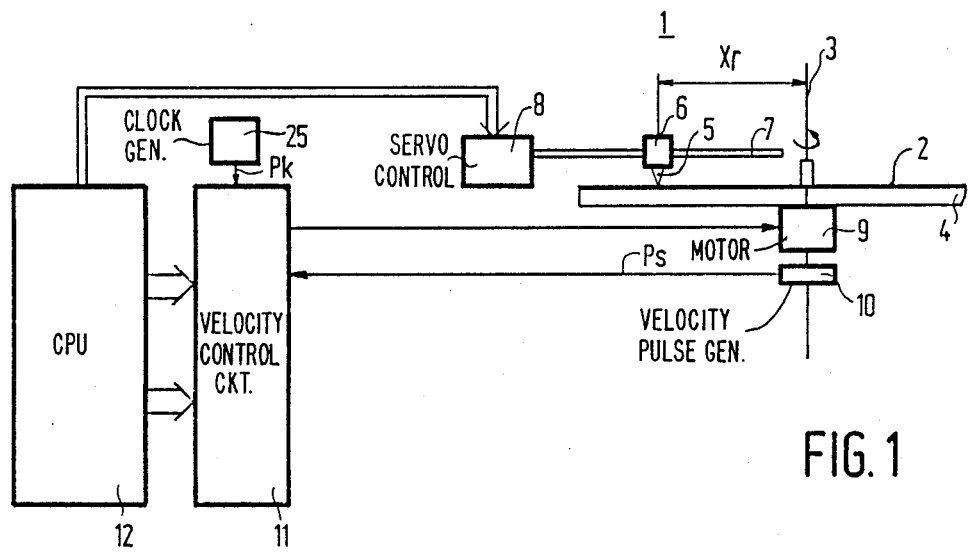
FIG. 1 shows an embodiment of a device in accordance with the invention for scanning a radiation-sensitive surface of a carrier.

FIG. 1 shows a scanning apparatus 1 for scanning a layer 2 of a radiation-sensitive material, for example a photoresist, by means of a radiation beam 5, which layer is deposited on a carrier 4, for example a glass substrate, which rotates about an axis 3. The radiation beam 5 is directed towards the layer 2 by means of an optical head 6. The optical head 6 can be moved in a radial direction relative to the record carrier 4 by means of a spindle 7 which is driven via a servo control system 8. In a customary manner the servo control system 8 controls the radial position Xr of the optical head 6 to obtain a desired positional value, which is set by a central processing unit 12. The carrier 4 is rotated by means of a drive system comprising a d.c. motor 9. A pulse generator, for example a pulse disc or a.c. tachogenerator 10 which is mechanically coupled to the motor, generates velocity pulses Ps of a frequency proportional to the angular velocity W of the motor 9 and the carrier 4. The velocity pulses Ps are applied to the control circuit 11 for controlling the angular velocity W of the carrier 4 to a desired angular-velocity value Wg, which can also be set by means of the central processing unit 12. Clock pulses Pk of constant frequency are provided to control unit 11 by a clock pulse generator 25.

As the layer 2 is being scanned the optical head 6 is radially moved by means of the central processing unit 12 and the servo control 8. The desired value Xrg for the radial distance of the position of the optical head, which position corresponds to the radial distance Xr between the point of incidence of the radiation beam 5 and the centre of rotation represented by the axis 3, is controlled in conformity with a predetermined function (see FIG. 4) of time by the central processing unit 12. Moreover, the central processing unit 12 controls the desired angular velocity Wg to a value which is inversely proportional to the distance Xr, so that the linear scanning velocity is always maintained constant. The central processing unit 12 may comprise, for example, a computer of a customary type, in which the radial distance values of the said function at equidistant instants are stored in a look-up table. During scanning the distance values of the function at the equidistant instants are read from the table and the desired radial position Xrg is controlled in conformity with the read-out distance value. Moreover, the desired angular velocity Wg can be controlled in conformity with the desired position Xrg. The settings of the desired values of Wg and Xrg as a function of time may also be computed in accordance with a predetermined algorithm during scanning.

Scanning apparatus 1 of the type described in the foregoing are mainly used in the manufacture of optically readable discs of the type which must be read with a constant linear velocity (CLV). During recording on the layer 2 the scanning radiation beam 5 is modulated in conformity with the information to be recorded.

Subsequently, the layer 6 is developed by means of, for example, a photo-etching process in which the scanned portions of the layer 2 are removed, after which a master disc having the desired information structure is obtained, from which master replicas are made.

Figure 2:
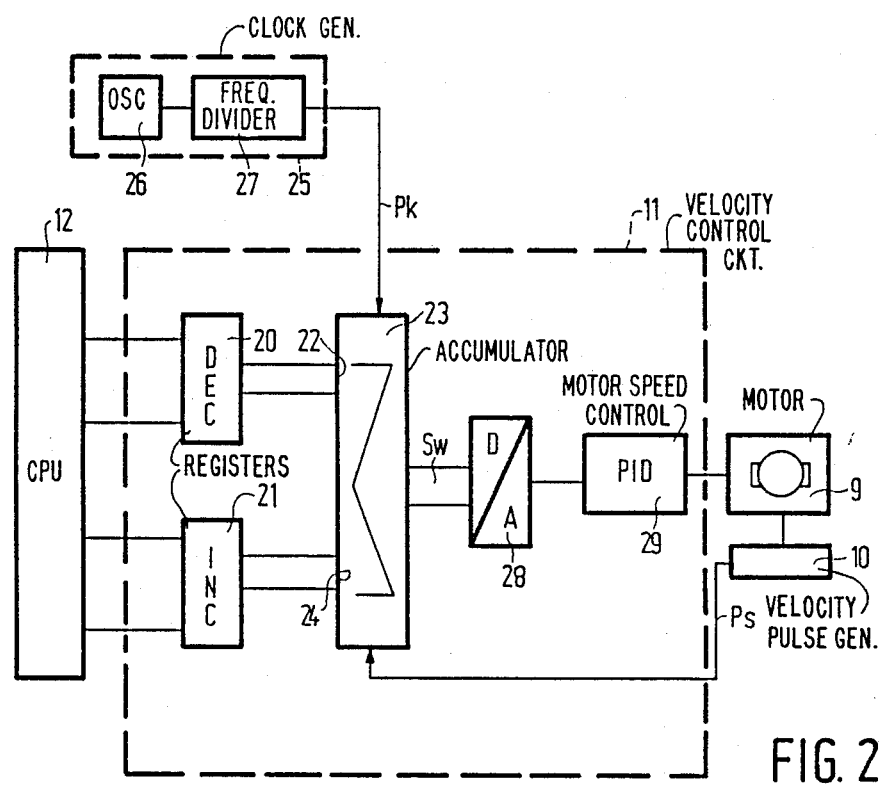
FIG. 2 shows an example of a control circuit for use in the scanning device of FIG. 1.

FIG. 2 shows in detail an example of the velocity control circuit 11. The control circuit 11 comprises a first register 20 and a second register 21, which can be loaded with a first digital correction value DEC and a second digital correction value INC respectively by the central processing means unit 12. The outputs of the register 20 are connected to inputs 22 of an accumulator circuit 23.

The outputs of the register 21 are connected to the inputs 24 of the accumulator circuit 23. The velocity pulses Ps are also applied to the accumulator circuit 23. Clock pulses Pk of constant frequency fk are also applied to the accumulator circuit 23. The clock pulses Pk are generated by means of a conventional clock generator 25 comprising an oscillator 26 and a frequency divider 27.

The accumulator circuit 23 is of a type which in response to a clock pulse Pk decrements a digital sum value Sw by the digital correction value DEC applied to the inputs 22 and in response to a velocity pulse Ps increments the sum value Sw by the digital correction value INC applied to the inputs 24. The sum value Sw is transferred to a digital-to-analog converter 28 which converts the digital sum value Sw into a corresponding analog signal, which is applied to an analog motor speed controller 29, for example a PID controller, for energising the motor 9 in conformity with the sum value Sw so as to maintain the average of the sum value Sw constant.

Figure 3:
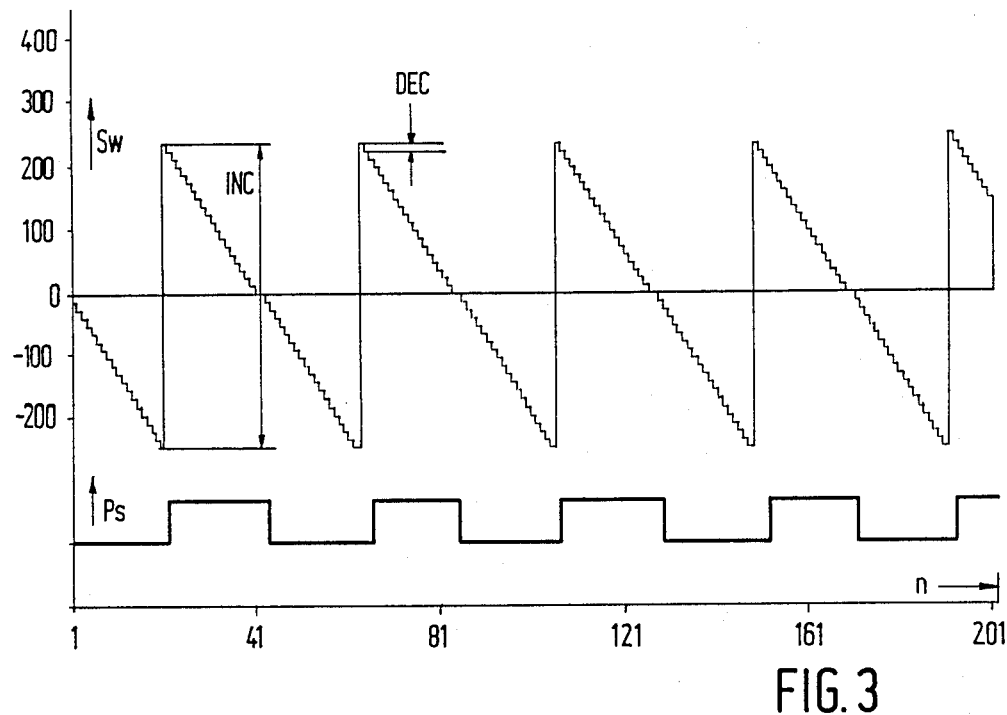
FIG. 3 shows signals generated in the control circuit of FIG. 2.

The operation of the velocity control circuit will now be described in more detail with reference to FIG. 3, which represents the sum value Sw of the velocity pulses Ps as a function of the number n of generated clock pulses Pk. In response to the positive edge of the velocity pulse Ps the sum value Sw is incremented by the relatively large value INC. In response to every clock pulse Pk the sum value is decremented by the relatively small value DEC. The sum value Sw thus obtained is converted into an analog signal, which is applied to the controller 29. The bandwidth of the control loop comprising the velocity control circuit 11, the motor 9 and the a.c. tachogenerator 10 and the frequencies of the clock pulses Pk and the velocity pulses Ps are adapted to one another in such a way that the frequency of the variation in the sum value Sw, which frequency is equal to the frequency of the clock pulses Pk, is so high that it is situated well outside the bandwidth of the control loop, which ensures that the variation of the sum value Sw hardly affects the motor angular velocity W. The motor 9 is then energised to produce an angular velocity Wg such that the average of the sum value Sw maintained constant, in the present case at zero.

The PID controller 29 is dimensioned in such a way that if the average of the sum value Sw exceeds said constant value the energising current of the motor 9 decreases, causing the number of revolutions of the motor 9 and hence the frequency fs of the velocity pulses Ps to decrease. The number of increments of the sum value Sw per unit of time is consequently reduced, so that the average sum value Sw decreases until it has become equal to said constant value.

In the case that the average sum value Sw is larger than the constant value the energisation will be adapted accordingly until the average sum value has again become equal to the constant value. In the case of a constant average sum value Sw the value INC multiplied by the frequency fs of the velocity pulses Ps is equal to the value DEC multiplied by the frequency fk of the clock pulses Pk. The angular velocity W of the motor and hence that of the record carrier 9 then complies with the following relationship;

$$W = 2\pi(fk \times DEC/INC)/N \tag{1}$$

where N is the number of velocity pulses Ps per revolution of the motor 9.

Since the angular velocity is adjustable by adjusting the quotient of the values INC and DEC, the number of possible settings is very large, yielding a very accurate control.

Figure 5:
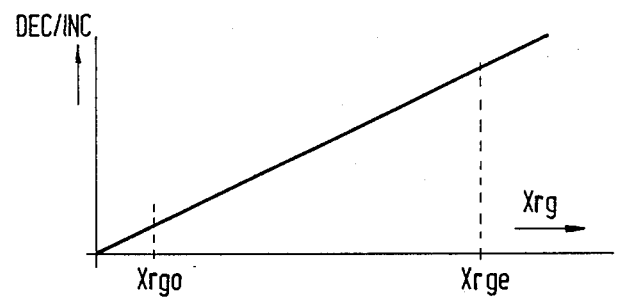
FIG. 5 represents the relationship between the desired radial position Xrg and the ratio between the correction values INC and DEC.

When the carrier 4 is to be scanned with a constant scanning velocity the desired angular velocity can therefore be established simply and very accurately by the central processing means unit 12 by adjusting the quotient INC/DEC to a value which is proportional to the radial distance Xr between the point of incidence of the radiation beam 5 and the axis 3. This may be effected, for example, by deriving the value to which the quotient INC/DEC is to be set from the desired value Xrg (see FIG. 5).

However, it is alternatively possible to store the values INC and DEC in the memory of the central processing means unit (see FIG. 8), or to compute these values as functions of time as two functions related to the desired variation in time of Xrg.

In order to minimise the influence of variations in sum value Sw it is desirable to select the lower of the two frequencies fs and fk so as to be as high as possible. Since it is easier to increase the frequency fk than to increase the number N of velocity pulses Ps generated per revolution of the motor 9, it is preferred to dimension the control loop in such a way that at the desired angular velocity Wg the frequency fk of the clock pulses Pk is higher than the frequency fs of the velocity pulses Ps.

Figure 6:
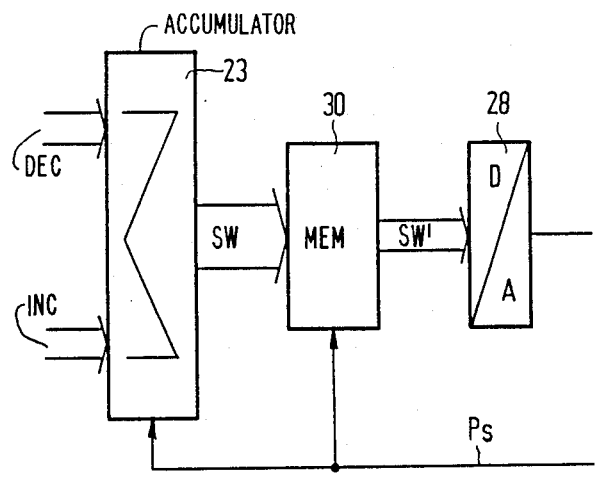
FIG. 6 shows a modification of the control circuit of FIG. 2.

FIG. 6 shows a modified control circuit 11 enabling the influence of the variation of the sum value Sw on the angular velocity W to be substantially eliminated. This modification involves including a memory 30, for example a clocked register, between the accumulator circuit 23 and the digital-to-analog converter 28. The memory 30 is only loaded with the sum value Sw at instants corresponding to a predetermined phase of the velocity pulses Ps. If, as in the example shown, the relative pulse width (duty cycle) of the velocity pulses Ps is constant, the memory 30 may comprise a register which is controlled by the negative edges of the velocity pulses Ps.

Figure 7:
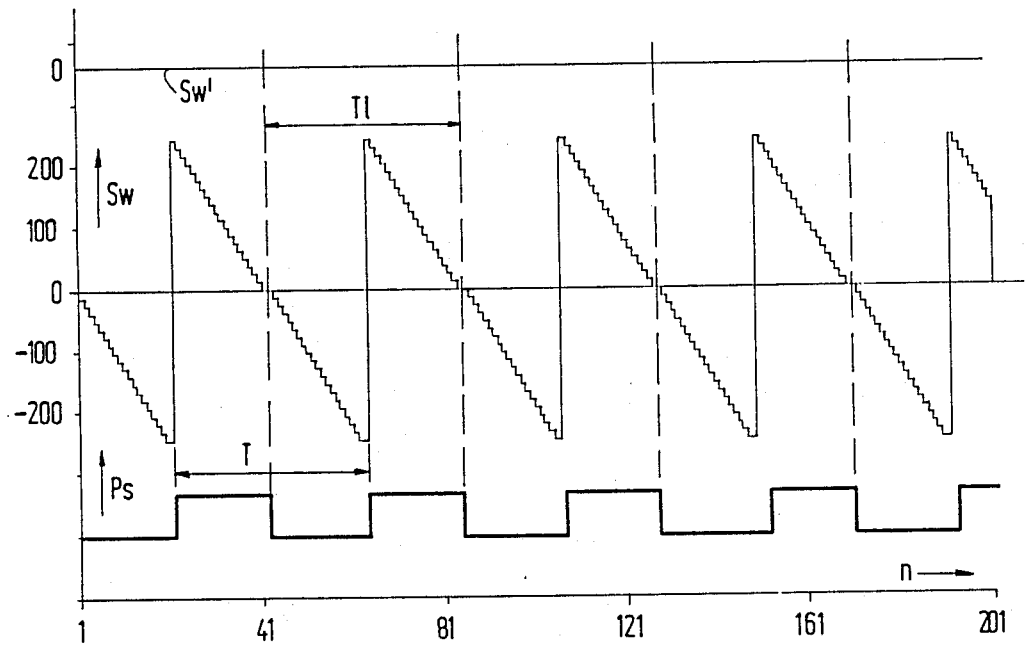
FIGS. 7 and 9 show signals generated in the modified control circuit of FIG. 6.

In addition to the sum value Sw and the velocity pulses Ps, FIG. 7 also shows the output signal Sw of the memory 30 as a function of the number n of clock pulses Pk. The time intervals T1 between the loading instants of the memory 30 are equal to the period T of the velocity pulses Ps, so that the variation of Sw' corresponds to the value of INC minus k times the value of DEC, k being the number of clock pulses Pk per time interval T1. If, as in the present example, the ratio INC/DEC is an integer, the angular velocity W is controlled to a value for which the ratio between the frequency fk and the frequency fs is also an integer.

This means that the change in sum value Sw' at successive loading instants of the memory 30 (which sum value is equal to the difference INC-k.DEC) is exactly zero, so that a particularly stable control of the angular velocity W is obtained. However, if as in general, the quotient INC/DEC is not an integer the angular velocity W will be controlled to a non-zero value for the difference between the sum values Sw' (=INC-k.DEC) at two successive loading instants. Moreover, the number of clock pulses between two consecutive loading instants is then not always the same. This results in a low-frequency oscillation of the sum value Sw and the selected sum value Sw' at the outputs of the memory 30.

Figure 9:
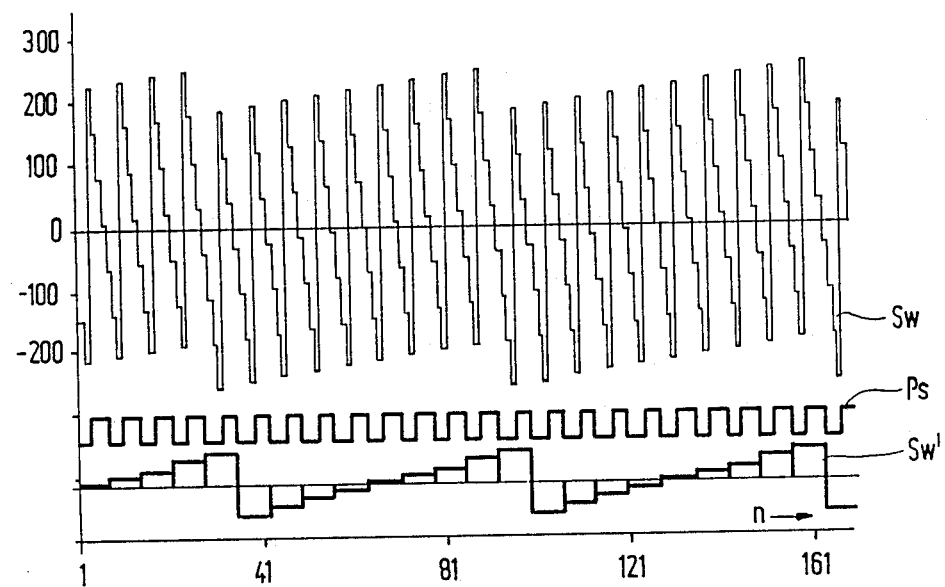

FIG. 9 shows this low-frequency oscillation of Sw and Sw' for a value of INC/DEC=3000/512. In order to prevent this oscillation from adversely affecting the control behaviour, the bandwidth of the control loop may be selected in such a way that the frequency of the oscillation is situated outside the control band.

Figure 10:
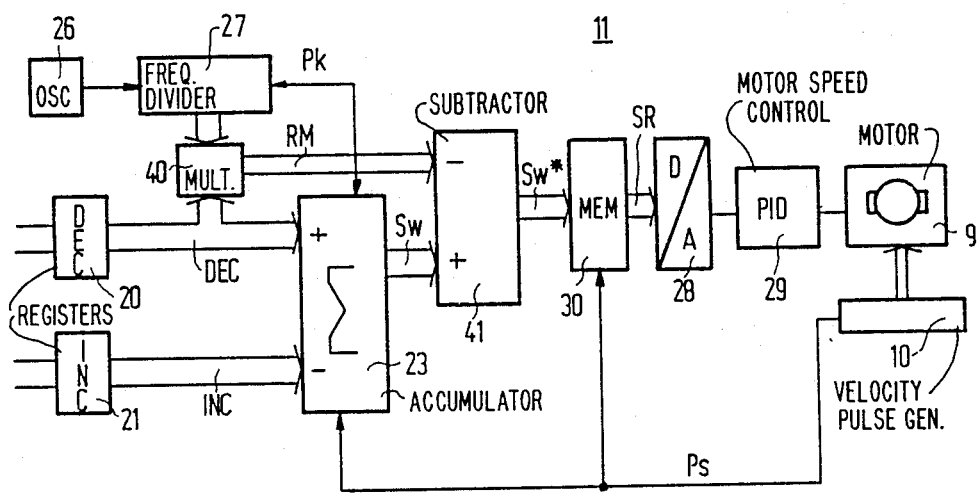
FIG. 10 shows another example of the control circuit.

An example of a velocity control circuit 11 which does no exhibit the above undesired oscillations is shown in FIG. 10, in which elements corresponding to the elements shown in FIGS. 2 and 6 bear the same reference numerals.

The frequency divider 27 of the control circuit 11 shown in FIG. 10 comprises a cyclic counter (not shown) which counts the pulses generated by the oscillator 26 and which, after having reached a maximum count MAX, is set to zero and at the same time generates a clock pulse Pk. The count TEL of the counter is applied to a first input of a multiplier circuit 40. The value of DEC stored in the register 20 is applied to the other input of the multiplier circuit 40. The multiplier circuit 40 is dimensioned in such a way that the result on the output is equal to TEL/MAX×DEC.

By means of a subtractor circuit 41 the result RM of the multiplication is subtracted from the sum value Sw, which is available on the output of the accumulator circuit 23. The result Sw* of the subtraction is applied to the input of the memory 30. The value of Sw* is loaded into the memory 30 at loading instants defined by the negative edges of the velocity pulses Ps.

The control value SR thus derived from the sum value Sw and the value RM and appearing on the output of the memory 30 is applied to the motor speed controller 29 via the digital-to-analog converter 28.

Figure 11:
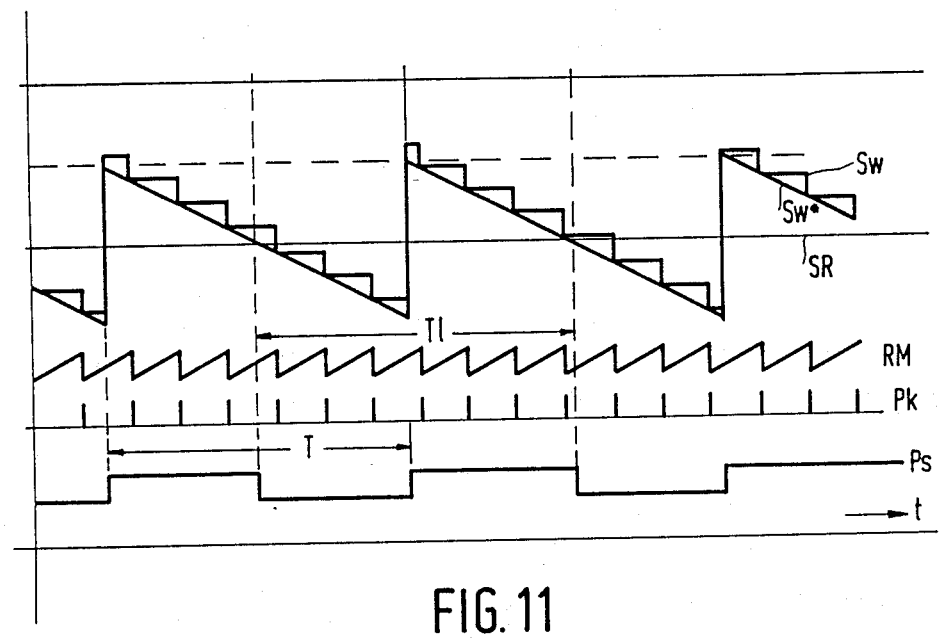
FIG. 11 shows signals generated in the control circuit of FIG. 10.

FIG. 11 shows the velocity pulses Ps, the clock pulses Pk, the sum value SW, the value SW*, and the control value SR as functions of time t. As is apparent from FIG. 11, the low-frequency oscillation is completely eliminated from Sw* and hence from the control value SR as a result of the correction of the sum value Sw by the value RM.

Figure 12:
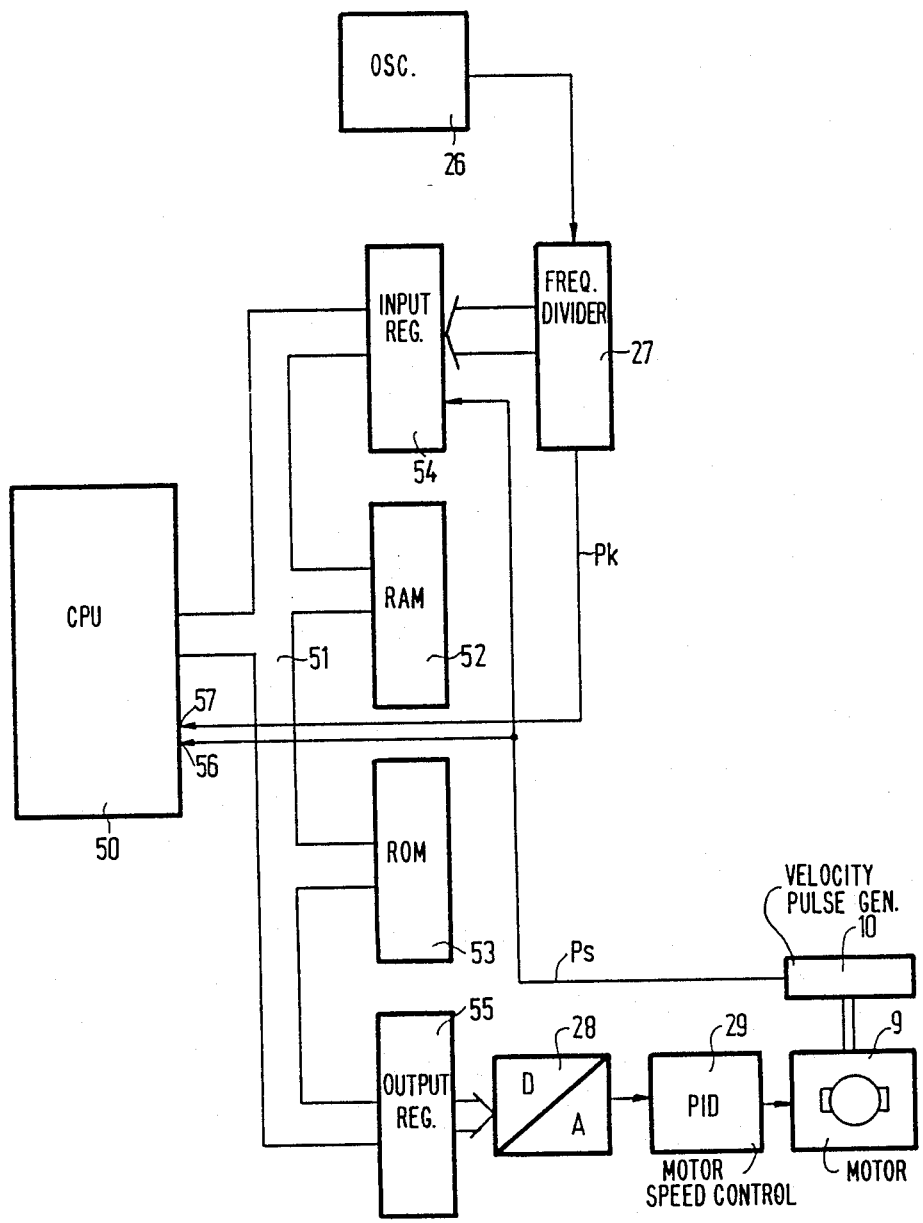
FIG. 12 shows yet another example of the control circuit.

FIG. 12 shows yet another example of the velocity control circuit 11 which together with the central processing unit 12 is included in a microcomputer system of a customary type. However, it is to be noted that it is also possible to incorporate the central processing circuit and the velocity control circuit each in a separate computer system. The microcomputer system comprises a central processing unit 50 (CPU) which by means of a bus 51 is connected to a random-access memory 52 (RAM), a read-only memory 53 (ROM), the outputs of a latch-type input register 54, and the inputs of an output register 55. The count TEL of the counter 27 is transferred to the inputs of the input register 54.

Figure 4:
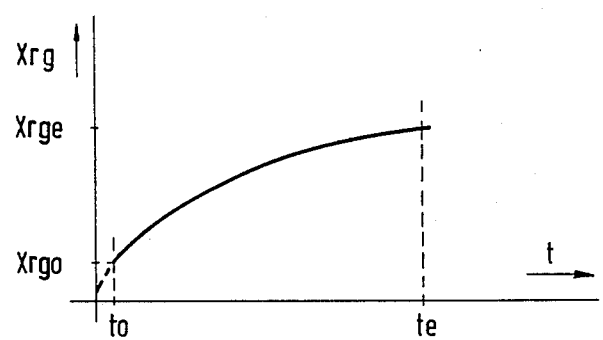
FIG. 4 is an example of the variation of the desired radial position Xrg as a function of time.
Figure 8:
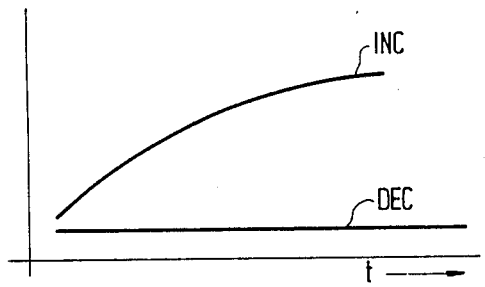
FIG. 8 shows an example of the desired variation of the correction values INC and DEC as a function of time during scanning.

The outputs of the output register 55 are connected to the inputs of the digital-to-analog converter 28. The read-only memory 53 is loaded with programs for adapting the sum value Sw in response to the velocity pulses Ps and the clock pulse Pk, for deriving the control value SR, for adapting the desired position Xrg and the values INC and DEC in conformity with interrelated time functions, for example those as shown in FIGS. 4 and 8. The function values of the functions are predetermined and stored in a table in the memory 52, or they are computed in accordance with a suitable algorithm during scanning.

Figure 13:
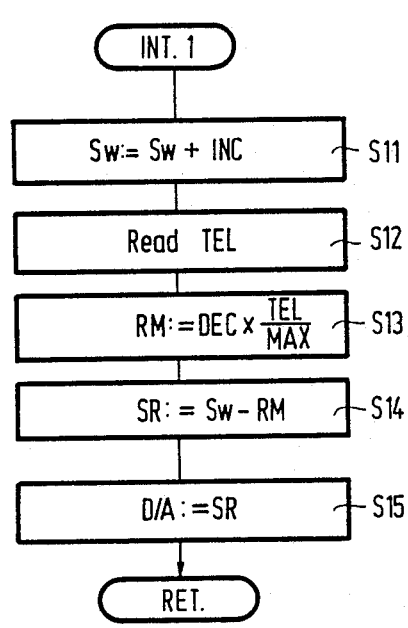
FIGS. 13 and 14 are flow charts of programs carried out by the computer in the control circuit of FIG. 12.
Figure 14:
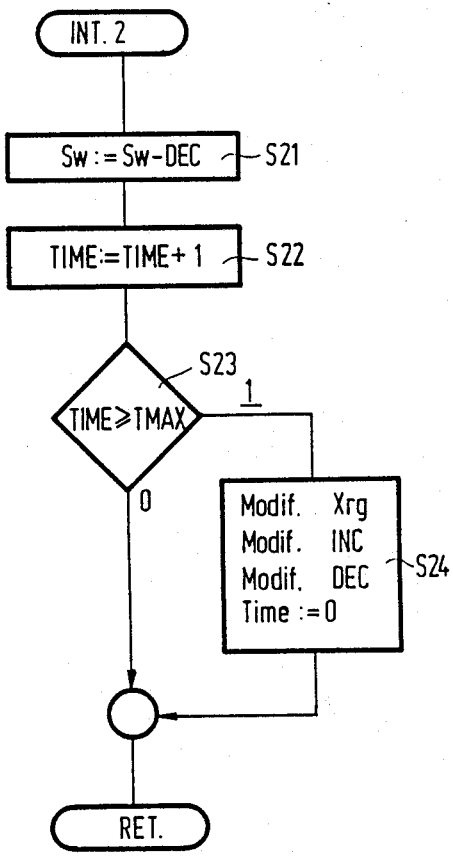

FIGS. 13 and 14, by way of illustration, give flow charts of examples of the above programs. The program INT1 is an interrupt program which is carried out in response to every velocity pulse Ps on a first interrupt input 56 of the central processing unit 50. In this program during the step S11 the sum value Sw is incremented by the value INC. Subsequently, in step S12 the count TEL of the counter 27 is read and in step S13 the value of RM is derived from the values of MAC, DEC and TEL. In step S14 the control value SR is derived from the values of Sw and RM and in step S15 the value SR is transferred to the digital-to-analog converter 28 by loading the output register 55. The program INT2 is an interrupt program which is carried out in response to a clock pulse Pk on a second interrupt input 57. During the step S21 of this program the sum value Sw is decremented by the value DEC. In step S22 the number of times TIME is counted that the program INT2 has been called after the last adaptation of the values of DEC, INC and Xrg. Since the frequency with which the program INT2 is called is constant, the value of TIME is always representative of the time which has elapsed since the last adaptation of INC, DEC and Xrg.

In setp S23 it is ascertained whether the value of TIME is larger than or equal to a limit value TMAX. If it is, the values of Xrg, INC and DEC are adapted again and the value of TIME is set to zero in step S24. Adaptation of Xrg, DEC and INC is possible, for example, by making the values of Xrg, DEC and INC equal to the next function values of the functions stored in the table in the memory 52.

Figure 15:
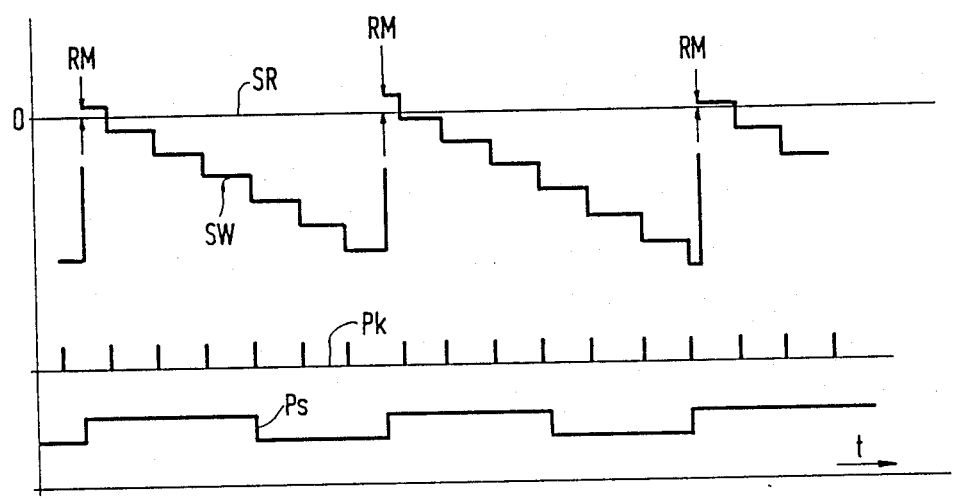
FIG. 15 shows variables, computed by means of the programs, as a function of time.

FIG. 15 shows the sum value Sw, the correction value RM and the control value SR, derived by means of the programs INT1 and INT2, as a function of time. The PID controller 29 controls the energisation of the motor 9 so as to maintain the control value SR equal to zero. The average value of Sw, which has a constant difference with the value SR, will therefore also be constant, so that by means of this control circuit the angular velocity is also maintained equal to the desired value Wg in accordance with equation (1) above.

What is claimed is:

1. Apparatus for scanning a disc-shaped optical record carrier with a radiation beam, such apparatus comprising: a drive system for rotating the carrier about an axis of rotation; an optical system radially movable relative to the carrier for directing the radiation beam to form a scanning spot thereon; and a velocity control circuit for maintaining the angular velocity of the carrier substantially inversely proportional to the radial distance between said axis of rotation and said scanning spot; characterized in that said velocity control circuit comprises:

a clock generator for generating clock pulses of a predetermined frequency;
    a velocity pulse generator for generating velocity pulses of a frequency differing from that of the clock pulses and which is proportional to the angular velocity of the carrier;

means for forming a first correction value (INC) in response to each velocity pulse and a second correction value (DEC) of opposite sign to said first correction value in response to each clock pulse;

accumulator means for deriving a sum value corresponding to the sum of said first and second correction values;

drive control means responsive to said sum value to cause said drive means to control the angular velocity of said carrier so as to maintain the average of said sum value substantially constant during successive cycles of the pulses of lower frequency; and means for adjusting said first and second correction values so as to maintain the ratio INC/DEC thereof proportional to the radial distance between said scanning spot and said axis of rotation.

2. Apparatus as claimed in claim 1, characterized in that said clock generator generates said clock pulses at a frequency higher than the frequency of the velocity pulses generated by said velocity pulse generator corresponding to a desired angular velocity of said carrier.

3. Apparatus as claimed in claim 2, characterized in that the velocity control circuit further comprises a memory and means for consecutively transferring to said memory the sum values produced by said accumulator means in response to consecutive velocity pulses; said drive means controlling the angular frequency of said carrier so as to maintain the sum values consecutively stored in said memory substantially constant.

4. Apparatus as claimed in claim 3, characterized in that said clock generator comprises an oscillator for generating pulses of a frequency higher than that of the clock pulses and a cyclic counter for counting the pulses from said oscillator and generating a clock pulse each time said counter reaches a maximum count; and said velocity control circuit further comprises: means for modifying said second correction value (DEC) by multiplying it by a third correction value which is equal to the ratio between the count of said counter and the maximum count thereof; said accumulator means forms a corrected sum value corresponding to the sum of said first correction value and said modified second correction value; and means for transferring to said memory the corrected sum value produced by said accumulator means in response to each velocity pulse.

5. A method of scanning a disc-shaped optical record carrier which rotates about an axis by a radiation beam which is directed to form a scanning spot on the carrier and is radially translated relative to said axis during such rotation, the angular velocity of the carrier being substantially inversely proportional to the radial distance between said axis and said scanning spot; such method comprising:

generating clock pulses of a predetermined frequency and velocity pulses of a frequency differing from that of the clock pulses and which is proportional to the angular velocity of said carrier;

forming in response to each velocity pulse a first correction value (INC) and in response to each clock pulse a second correction value (DEC) of opposite sign to said first correction value, and deriving a sum value corresponding to the sum of such correction values;

controlling the angular velocity of said record carrier so as to maintain the average of said sum values substantially constant during successive cycles of the pulses of lower frequency; and adjusting said first and second correction values so as to maintain the ratio INC/DEC thereof substantially proportional to the radial distance between said scanning spot and said axis of rotation.

6. A method as claimed in claim 5, characterized in that the clock pulse frequency is higher than the velocity-pulse frequency corresponding to a desired angular velocity of said carrier.

7. A method as claimed in claim 6, characterized in that for controlling the angular velocity only sum values at instants corresponding to a predetermined phase of the velocity pulses are selected.

8. A method as claimed in claim 7, characterized in that the clock pulses are derived from a periodic signal of a higher frequency by means of a cyclic counter, a clock pulse being generated each time that a final count is reached, to correct the selected sum value by a third correction value equal to the ratio between the number of clock pulses counted, as represented by the instantaneous count, and the counting range of the counter, multiplied by the first correction value, and the angular velocity of the record carrier being controlled to a value for which the average of the corrected selected sum value is substantially constant.

9. A method as claimed in claim 7, characterized in that: the clock pulses are derived from a periodic signal of a higher frequency than such pulses by means of a cyclic counter, a clock pulse being generated each time said counter reaches a maximum count; said second correction value (DEC) is modified by a third correction value equal to the ratio between the instantaneous count of said counter and the maximum count thereof; each of said sum values is modified in accordance with said modified second correction value; and the angular velocity of the record carrier is controlled so as to maintain the selected corrected sum values substantially constant.

* * * * *